United States Patent [19]

Castens et al.

[11] Patent Number: 5,100,366

[45] Date of Patent: Mar. 31, 1992

[54] FOOD PREPARATION APPARATUS

[76] Inventors: Marcel J. Castens, 2/18 Hedges Avenue, Mermaid Beach 4218, Queensland; Stephen A. Duncanson, 42 Laddsridge Road, West Burleigh 4219, Queensland, both of Australia

[21] Appl. No.: 330,742

[22] Filed: Mar. 30, 1989

[30] Foreign Application Priority Data

Mar. 31, 1988 [AU] Australia .................... PI7535

[51] Int. Cl.⁵ ............................................. A22C 17/00
[52] U.S. Cl. ..................................................... 452/198
[58] Field of Search .............. 17/15; 452/198; 83/454, 83/466.1; 99/419

[56] References Cited

U.S. PATENT DOCUMENTS

| 3,579,713 | 5/1971 | Kang et al. | 17/15 |
| 4,429,435 | 2/1984 | Walls | 17/15 |
| 4,583,263 | 4/1986 | Wigley, Jr. | 17/15 |

Primary Examiner—Willis Little
Attorney, Agent, or Firm—Kimmel, Crowell and Weaver

[57] ABSTRACT

Apparatus for preparing shish kebabs or satays including a pair of bodies, each of which defines an elongated trough having a plurality of spaced apart barriers defining respective compartments for food pieces. The bodies may be engaged so that opposite compartments therein cooperate to capture the food pieces and the barriers are provided with opposed slots which cooperate to define a series of aligned apertures for the passage of a skewer through the troughs and the captured food pieces.

7 Claims, 3 Drawing Sheets

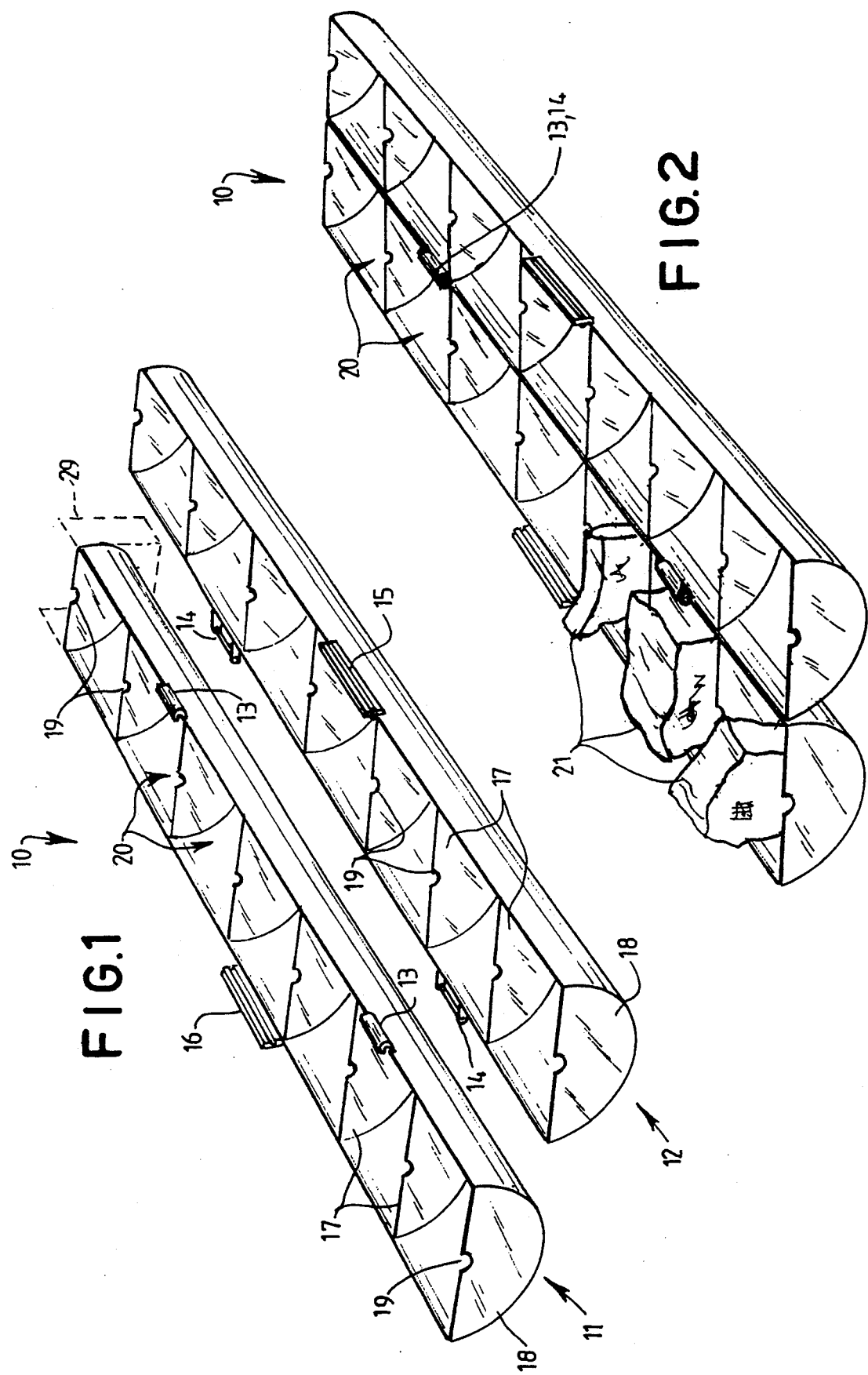

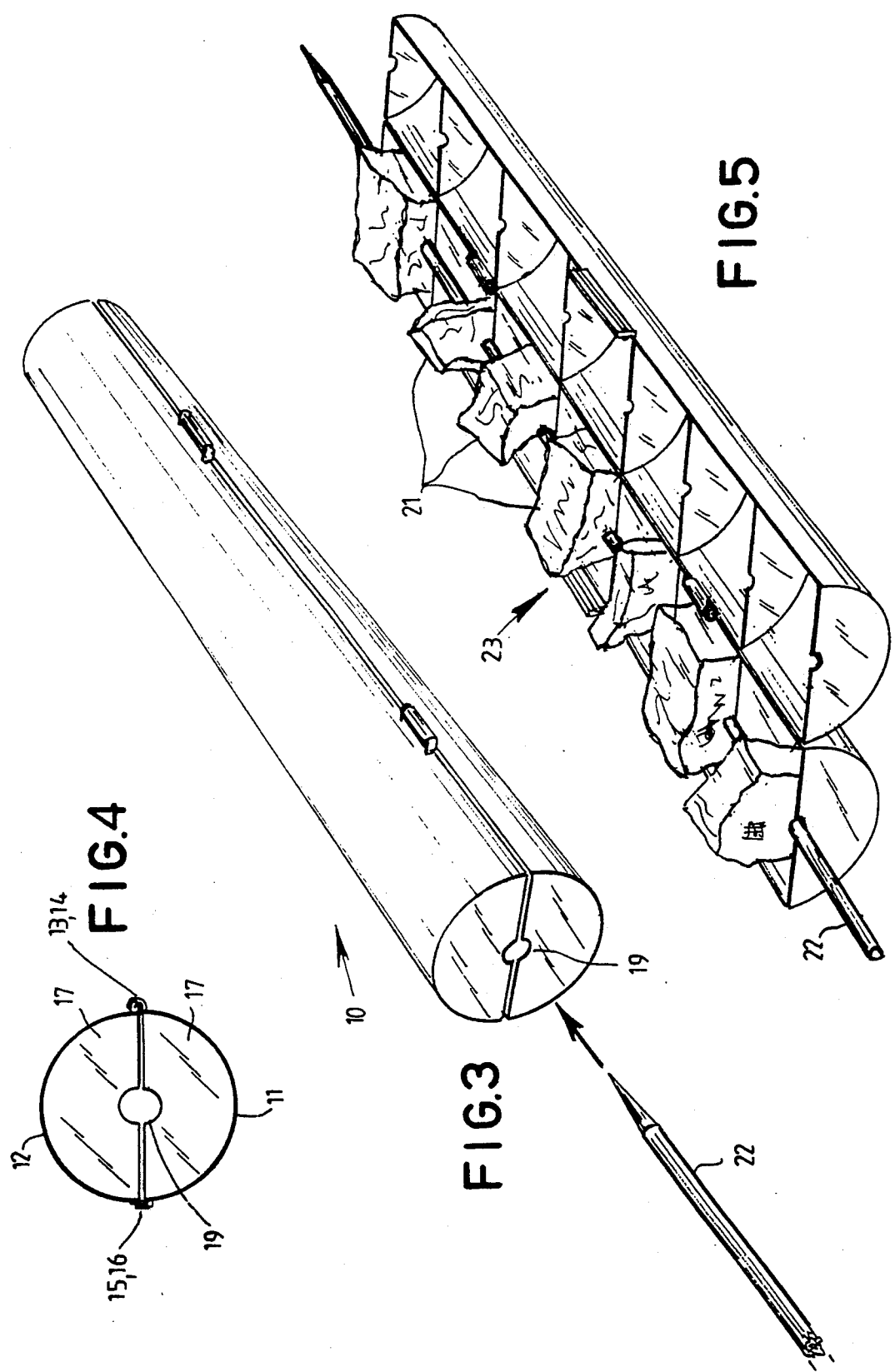

FOOD PREPARATION APPARATUS

BACKGROUND OF THE INVENTION

1. Field of the Invention

THIS INVENTION relates to food preparation apparatus and in particular to apparatus for preparing food dishes of the type including a plurality of cubes of meat, vegetables and/or fruit arranged on a skewer for example shish kebabs or satays.

2. Description of the Related Art

The preparation of shish kebabs and/or satays is a time consuming procedure. Initially the food pieces to be arranged on skewers are required to be cut up or cubed to the required size after which the cubed meat or other food components may be marinated if desired. Subsequently the respective food components are required to be arranged individually on skewers which may be formed of timber suitably bamboo or metal. This procedure is extremely tedious so that many hours are often required to prepare such forms of food particularly in restaurant situations. This obviously leads to increased labour costs contributing to an overall increase in the cost of the prepared food. Furthermore, the placement of skewers through the cut up or cubed food pieces can be dangerous to the person preparing the food as in many cases the skewers tend to slip causing damage to the hands.

BRIEF SUMMARY OF THE INVENTION

The present invention aims to overcome or alleviate at least one of the above disadvantages by providing apparatus which facilitates the preparation of food dishes of the type having a plurality of pieces of meat, vegetables and/or fruit arranged on a skewer and which permits such food dishes to be prepared in a rapid and efficient manner. The present invention also aims to provide apparatus for the aforementioned purpose which is safe in use. The present invention further provides a method of preparation of skewered food products using the apparatus of the invention. Other objects and advantages of the invention will become apparent from the following description.

With the above and other objects in view, the present invention resides in a first preferred aspect in apparatus for preparing food dishes of the type including a plurality of pieces or cubes of food arranged on a skewer, said apparatus including a first body defining a first elongated trough, a second body defining a second elongated trough, said first and second bodies being adapted to be engaged so that said first and second troughs are arranged in an opposed co-operating attitude so as to capture a plurality of food pieces therein, first and second wall means at opposite ends of said co-operating troughs, and aperture means through said wall means and adapted to permit passage of a said skewer therethrough and through said food pieces in said troughs.

Suitably the first and second wall means include walls secured to or forming part of said first or second bodies, said walls being slotted to define said aperture means. In one preferred form, the first and second wall means are defined by walls on said first and second bodies, said walls co-operating when the troughs are arranged in a co-operating attitude to close off the ends of the troughs to hold said food pieces captive therein, at least one of the walls being slotted or apertured to permit the passage of a skewer therethrough.

In a second preferred aspect, the present invention resides in apparatus for preparing food dishes of the type including a plurality of pieces or cubes of food such as meat, vegetables and/or fruit arranged on a skewer, said apparatus including first and second bodies defining respective elongated troughs, each said trough including a plurality of transversely extending barriers defining therebetween a plurality of compartments adapted to receive said food pieces, said bodies being adapted to be disposed in opposing relationship so that said barriers in the respective said bodies co-operate to define a plurality of substantially enclosed compartments for capturing therein respective said pieces of food, and there being provided means for guiding a skewer in an longitudinal direction and centrally through said bodies and said food pieces therein.

Preferably, the troughs are of half circular form in cross-section, however, they may be of any other cross-sectional form for example square, rectangular, ellipsoid or triangular. Suitably, the barriers are in the form of walls which are provided with central half circular slots in their upper edges which co-operate with similar slots in the corresponding walls of the opposite troughs when the two bodies are disposed in an opposing relationship to define a series of generally circular apertures through which a skewer may be guided. The slots of course may be of any shape which will co-operate with the slots in the opposite wall to define a through aperture for passage of the skewer.

Suitably, the respective bodies are hinged together to move between an attitude where they may be loaded to an attitude where they are opposed and co-operate to retain and capture the food pieces. The bodies may be formed of metal or plastics or any other material.

In a third preferred aspect, the present invention provides apparatus for preparing food dishes of the type including a plurality of pieces or cubes of food such as meat, vegetables and/or fruit arranged on a skewer, said apparatus including a first body having a plurality of open topped compartments therein, said compartments being longitudinally aligned and being adapted to contain respective said food pieces, and there being provided means for guiding a said skewer longitudinally of and through said compartments and said food pieces therein.

Preferably a second body is provided to co-operate with the first body to capture the food pieces in the compartments and suitably, the second body also includes a plurality of similar compartments which are adapted to co-operate with the compartments in the first body to capture the food pieces therein. Suitably the respective compartments are defined between respective pairs of transverse walls in the bodies.

BRIEF DESCRIPTION OF THE DRAWINGS

In order that the invention may be more readily understood and put into practical effect, reference will now be made to the accompanying drawings which illustrate preferred embodiments of the invention and wherein:

FIG. 1 is a perspective view showing the separate components of the apparatus of the present invention;

FIG. 2 is a perspective view showing the components of the apparatus assembled and receiving food pieces;

FIG. 3 illustrates the apparatus of the invention in a mode for receipt of a skewer;

FIG. 4 is a transverse sectional view of the apparatus of FIG. 3 showing the co-operation between the barriers;

FIG. 5 is a view of the prepared food product in one of the apparatus bodies after skewering.

DETAILED DESCRIPTION OF THE INVENTION

Figure 6:
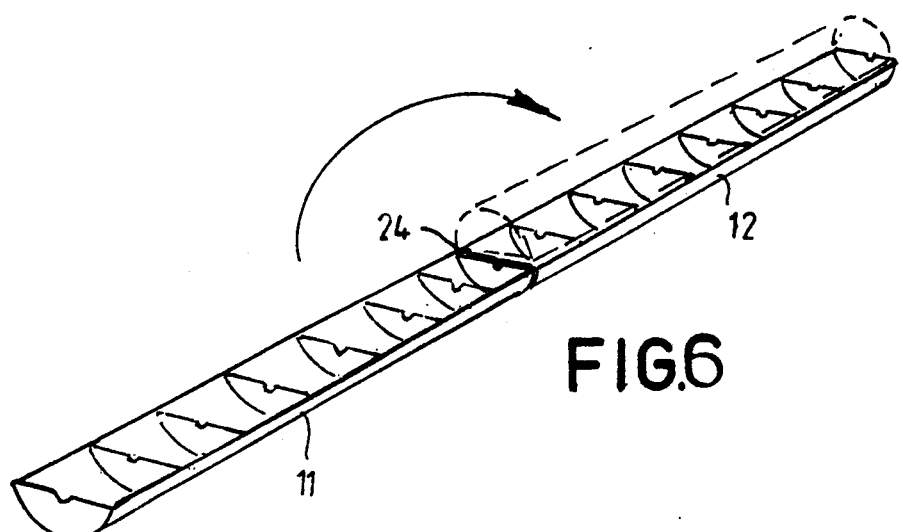
FIGS. 6, 7 and 8 illustrate alternative embodiments of the invention.

Referring to the drawings and firstly to FIG. 1 there is illustrated food preparation apparatus 10 according to the present invention including a pair of trough-like bodies 11 and 12 which in this instance are of half circular form in cross section and which are preferably provided on one side with co-operative hinge parts 13 and 14 respectively so that the bodies 11 and 12 can be hinged together along one side for movement between the open attitude shown in FIG. 2 and the closed attitude shown in FIG. 3. The bodies 11 and 12 may also be provided with co-operative latch parts 15 and 16 which may be inter-engaged to hold the bodies in the FIG. 3 attitude.

Each body 11 and 12 is provided with a plurality of spaced transversely extending dividing walls 17 of half-circular form in this embodiment with the walls 17 in the body 11 being spaced apart the same distance as the walla 17 in the body 12 for a purpose which will hereinafter become apparent. As shown the walls 17 as well as the respective end walls 18 of the bodies are provided with central longitudinally aligned half-circular slots or cut-out portions 19 in their top edges and the respective walls 17 define therebetween respective longitudinally aligned open topped recesses or compartments 20 for receipt of food pieces as described below.

In use, the respective bodies 11 and 12 may be assembled in the manner shown in FIG. 2 and pieces of meat, fruit and/or vegetables 21 which have been cut up or cubed are placed in the compartments 20 of one of the bodies 11. This procedure may be continued until all the compartments 20 in the body 11 are filled. The other body part 12 may then be pivoted over the body part 11 so that the respective walls 17 co-operate in the manner shown in FIG. 4 to hold the food pieces captive in the substantially closed spaces defined by the co-operating compartments 20.

A skewer 22 which comprise a bamboo or other wood skewer or metal skewer is then inserted into the end of the apparatus 10 through the co-operating cut out portions 19 in the end wall 18 and forced through the respective food pieces being guided as it passes longitudinally through the apparatus 10 by the series of aligned apertures defined by the co-operating cut out portions 19 in the respective co-operating walls 17.

After the skewer 22 has passed through the food piece in the end compartments 20 and out of the end of the apparatus 10, the body 12 may be pivoted open to the position shown in FIG. 5 revealing the skewered food product 23 which may simply be removed and cooked when desired. The apparatus then may be cleaned and/or reused.

The hinge parts 13 and 14 may be detached so that the bodies 11 and 12 are separate which will facilitate cleaning. The hinge between the bodies 11 and 12, however, may comprise a permanent connection such as an integrally formed thin web. Alternatively, the hinge parts 13 and 14 may be eliminated and the two bodies 11 and 12 provided as individual parts which may include co-operative guiding posts, sockets or other means which will ensure that the two bodies 11 and 12 can be aligned in opposing relationship for holding the food pieces in the manner described above.

In an alternative arrangement shown in FIG. 6, the two bodies 11 and 12 may be hingedly interconnected at 24 for pivotal movement about a transverse axis, between the open position shown, for receipt of the food pieces to the closed position shown in dotted outline.

Figure 7:
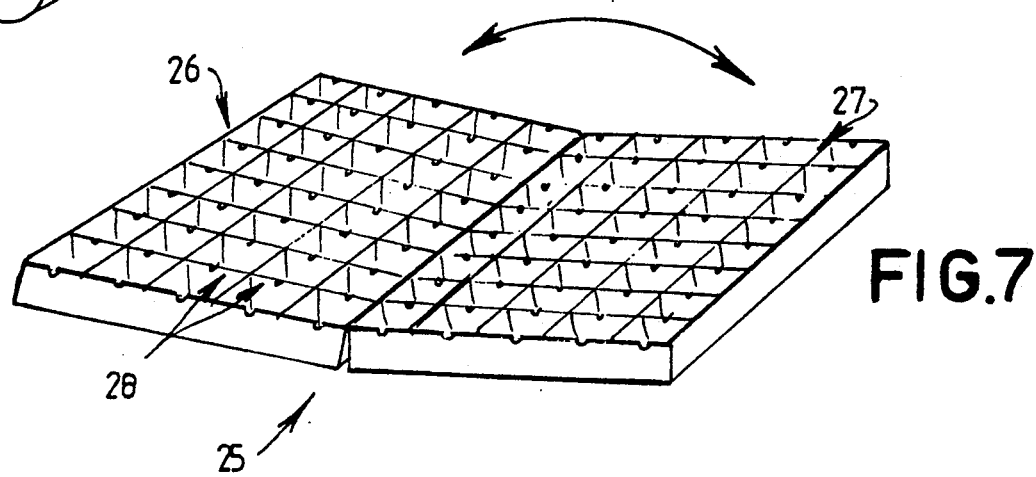

In FIG. 7 there is illustrated an alternative embodiment of the invention designed for producing a plurality of skewered food products. In this embodiment, the apparatus 25 includes two parts 26 and 27 each including a plurality of side-by side troughs 28 compartmented in a similar manner to the troughs 11 and 12 of FIG. 1. This apparatus 25 is used in a similar manner to the apparatus of FIGS. 1 to 6 with the two parts 26 and 27 co-operating to define a substantially closed series of compartments which hold the food pieces captive with the co-operating opposed walls of the compartments being slotted so as to define apertures for the passage of respective skewers therethrough. Again, the parts 26 and 27 may be hinged together or be separate parts.

The outer walls of the bodies 11 and 12 may be apertured if desired to permit the draining of juices therefrom and the apparatus may be formed of plastics material or metal such as stainless steel or aluminium.

Figure 8:
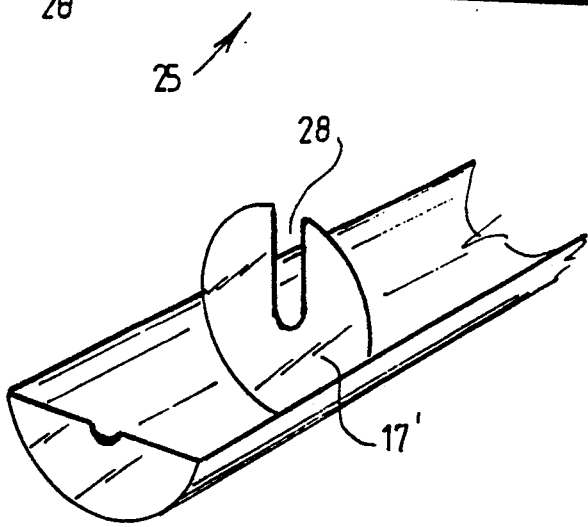

In a further alternative arrangement, the walls 17' of one body 12 may be extended in the manner shown in FIG. 8 and slotted at 28 down to the centre to permit skewers to be removed from the apparatus after preparation of the skewered food products. In this configuration, the body 12 may be used with a further open trough like body having the end walls 18 but no dividing walls or by itself with the food pieces simply placed into the compartments and the skewer passed through the slots 28.

To prevent the apparatus of FIGS. 1 to 5 rolling from a bench when assembled, the apparatus may be provided with a stand. Alternatively, one or both ends of the bodies 11 and 12 may be provided with "squared-off" extensions 29 (see FIG. 1). Alternatively, projections may be provided on the bodies 11 and/or 12 for the same purpose.

It will be realised that the apparatus described above may be provided with any number of compartments as desired. Furthermore, the walls 17 may be made to engage each other when the two body parts 11 and 12 (or 26 and 27) are closed. The walls 17 may also be provided with sharpened edges which may co-operate with each other. Other variations and modifications to the invention as will be apparent to persons skilled in the art and are deemed to fall within the broad scope and ambit of the invention as defined herein.

What we claim is:

1. Apparatus for preparing food dishes of the type including a plurality of pieces of food arranged on a skewer, said apparatus including:
    a first body defining a first elongated trough;
    a plurality of transversely extending barriers arranged at spaced apart positions along said first trough to define a first series of longitudinally aligned compartments in said first trough;
    said compartments of said first trough comprising hollow open topped cavities, said cavities being closed at their bases and including side walls terminating in normally upper edges surrounding the open tops of said cavities, the upper edges of said cavities being disposed in substantially the same plane;

each said transverse barrier of said first trough having a slot in its normally upper edge, said slots in said transverse barriers of said first trough being longitudinally aligned and disposed centrally of said first trough;

a second body defining a second elongated trough;

a plurality of transversely extending barriers arranged at spaced apart positions along said second trough to define a second series of longitudinally aligned compartments in said second trough;

said compartments of said second trough comprising hollow open topped cavities, said cavities being closed at their bases and including side walls terminating in normally upper edges surrounding the open tops of said cavities, the upper edges of said cavities being disposed in substantially the same plane;

each said transverse barrier of said second trough having a slot in its normally upper edge, said slots in said transverse barriers of said second trough being longitudinally aligned and disposed centrally of said second trough;

the barriers in said first rough being spaced apart substantially the same distance as the barriers in said second trough;

means for positioning said first and second bodies in an opposing relationship;

said barriers in said first trough being substantially aligned with said barriers in said second trough and said normally upper edges thereof being disposed adjacent to each other and the corresponding said upper edges of said cavities in said first and second bodies respectfully being adjacent to each other when said first and second bodies are disposed in said opposing relationship so that said first series of compartments co-operate with said second series of compartments to define a plurality of substantially closed compartments for capturing food pieces therein; and said slots in said barriers defining a longitudinally aligned series of apertures centrally of said opposing bodies for guiding a skewer in a longitudinal direction through said apparatus so as to penetrate respective food pieces captured in said closed compartments.

2. Apparatus according to claim 1 and including hinge means adapted to interconnect said first and second bodies whereby said bodies may be pivoted towards and away from said opposing relationship.

3. Apparatus according to claim 2 wherein said hinge means interconnect said first and second bodies along one side thereof so that said bodies are pivotally interconnected for movement about an axis extending longitudinally of said bodies.

4. Apparatus according to claim 2 wherein said hinge means interconnect said first and second bodies at one end thereof so that said bodies are pivotally interconnected for movement about an axis extending transversely of said bodies.

5. Apparatus for preparing food dishes of the type including a plurality of pieces of food arranged on a skewer, said apparatus comprising:

a first body including a first series of longitudinally aligned compartments separated by transverse barriers;

said compartments of said first body comprising hollow open topped cavities, said cavities being closed at their bases and including side walls terminating in normally upper edges surrounding the open topes of said cavities, said upper edges of said cavities being disposed in substantially the same plane;

a second body including a second series of longitudinally aligned compartments separated by transverse barriers;

said compartments of said second trough comprising hollow open topped cavities, said cavities being closed at their bases and including side walls terminating in normally upper edges surrounding the open tops of said cavities, said upper edges of said cavities being disposed in substantially the same plane;

said barriers in said first and second bodies including slots in their upper edges, said slots being aligned longitudinally of and arranged centrally of the respective said bodies:

said compartments of said first body corresponding in spacing to said compartments of said second body;

means for positioning said first and second bodies in an opposing relationship;

said compartments in said first body being substantially aligned with said compartments in said second body and the corresponding said upper edges of said cavities in said first and second bodies respectfully being disposed adjacent to each other when said first and second bodies are disposed in said opposing relationship so that said cavities co-operate to define a plurality of substantially closed compartments for capturing said food pieces therein; and said slots in said barriers of said first and second bodies respectively cooperating to define a series of longitudinally aligned apertures for guiding a skewer in a longitudinal direction through said apparatus so as to penetrate food pieces captured in said closed compartments.

6. Apparatus for preparing food dishes of the type including a plurality of pieces of food arranged on a skewer, said apparatus comprising:

a first elongated body of arcuate external cross section section and having therein a first series of longitudinally aligned spaced apart cavities separated by transverse barriers;

said cavities having an open top and side walls terminating in normally upper edges about said open top, said upper edges of said cavities being disposed in substantially the same plane;

a second elongated body of arcuate external cross section and having therein a second series of longitudinally aligned open topped cavities separated by transverse barriers;

said cavities having an open top and side walls terminating in normally upper edges about said open top, said upper edges of said cavities being disposed in substantially the same plane;

said barriers in said first and second bodies including slots in their upper edges, said slots being aligned longitudinally of and arranged centrally of the respective said bodies;

said cavities of said first body corresponding in spacing to said cavities of said second body;

means for positioning said first and second bodies in an opposing relationship;

and whereby when said first and second bodies are disposed in said opposing relationship, said cavities in said first body are substantially aligned with said cavities in said second body and said upper edges of corresponding said cavities in said first and second bodies respectfully are disposed adjacent to each other so that said cavities cooperate to define a plurality of substantially closed compartments for capturing said food pieces therein; and said upper edges of said barriers of said first and second bodies respectively are disposed adjacent to each other so that the opposed slots in the respective said barriers cooperate to define a series of longitudinally aligned apertures for guiding a skewer in a longitudinal direction through said apparatus so as to penetrate food pieces captured in said closed compartments.

7. Apparatus for preparing food dishes of the type including a plurality of pieces of food arranged on a skewer, said apparatus comprising:

a first elongated body of arcuate external cross section section and having therein a first series of longitudinally aligned spaced apart open topped cavities separated by transverse barriers;

a second elongated body of arcuate external cross section and having therein a second series of longitudinally aligned open topped cavities separated by transverse barriers;

said barriers in said first and second bodies including slots in their normally upper edges, said slots being aligned longitudinally of and arranged centrally of the respective said bodies;

said cavities of said first body corresponding in spacing to said cavities of said second body;

means for positioning said first and second bodies in an opposing relationship;

said cavities in said first body being substantially aligned with said cavities in said second body and said upper edges of said barriers in said first body being disposed adjacent said upper edges of said barriers in said second body respectively when said first and second bodies are disposed in said opposing relationship whereby:

said cavities cooperate to define a plurality of substantially closed compartments for capturing said food pieces therein, and said slots in said barriers cooperate to define a series of longitudinally aligned apertures for guiding a skewer in a longitudinal direction centrally through said apparatus so as to penetrate food pieces captured in said closed compartments;

said first and second bodies when opposed cooperating to define an elongate body assembly of generally tubular external form.

* * * * *